(12) United States Patent
Botelho

(10) Patent No.: US 6,719,507 B2
(45) Date of Patent: Apr. 13, 2004

(54) TIE-DOWN STRAP WINCH BAR

(76) Inventor: James H. Botelho, 24320 W. Hwy. 152, Los Banos, CA (US) 93635

( * ) Notice: Subject to any disclaimer, the term of this patent is extended or adjusted under 35 U.S.C. 154(b) by 0 days.

(21) Appl. No.: 10/179,428

(22) Filed: Jun. 24, 2002

(65) Prior Publication Data

US 2003/0082022 A1 May 1, 2003

Related U.S. Application Data

(60) Provisional application No. 60/301,039, filed on Jun. 25, 2001.

(51) Int. Cl.7 .............................. B61D 45/00; B25F 1/00
(52) U.S. Cl. ....................................... 410/100; 410/103
(58) Field of Search ................................. 410/100, 103, 410/12, 96, 97, 156, 106, 101; 16/110.1, 114.1; 254/223, 243, 247, 323; 24/68 CD, 265 CD; 248/499

(56) References Cited

U.S. PATENT DOCUMENTS 2,946,563 A * 7/1960 Eaton
3,053,508 A * 9/1962 Schultz
4,475,854 A * 10/1984 Ericsson .................... 410/103
4,510,652 A * 4/1985 Van Iperen ................. 410/103
5,549,429 A * 8/1996 Sergent ....................... 410/96
6,139,234 A * 10/2000 Huang ........................ 410/103
2002/0153517 A1 * 10/2002 Huang ........................ 410/103

* cited by examiner

Primary Examiner—D. Glenn Dayoan
Assistant Examiner—H. Gutman
(74) Attorney, Agent, or Firm—Richard A. Ryan

(57) ABSTRACT

A winch bar for use with tie-down strap winches has an elongated bar member, an insert member attached to the bar member, a bar pawl pivotally attached to the bar member and a spring to bias the bar pawl toward the insert member. The bar pawl abuts the insert member when the winch bar is in a closed position. The spring is disposed between a first spring connector attached to the bar member and a second spring connector attached to the bar pawl. With the insert member engaged in the strap winch, the winch bar winds the strap winch winding drum by operatively engaging the strap winch ratchet wheel when pivoted in the tightening direction. When pivoted in the opposite direction, the bar pawl ratchets against the ratchet wheel to allow winding of the winding drum without having to remove the winch bar from the strap winch.

20 Claims, 3 Drawing Sheets

TIE-DOWN STRAP WINCH BAR

CROSS-REFERENCE TO RELATED APPLICATIONS

This application claims the benefit of U.S. Provisional Application No. 60/301,039 filed Jun. 25, 2001.

BACKGROUND OF THE INVENTION

A. Field of the Invention

The field of the present invention relates generally to devices that are used to secure loads on trucks or trailers. More specifically, this invention relates to winch bars used to operate strap winches to tighten the straps used to secure the load. Even more specifically, this invention relates to winch bars that have a ratchet mechanism to allow the user to more easily tighten the straps.

B. Background

As is well known in the trucking industry, tie-down straps are commonly used to secure cargo onto a truck or trailer, such as those trucks having a flat bed portion or flat bed trailers. Depending on the size of the load, one or more straps are used to secure the load. One end of each strap is connected to one side of the truck or trailer, usually using a stake or anchor ring, and the strap is placed over the load such that when tightened it will hold the load onto the truck or trailer. The opposite end of the strap is connected to a corresponding strap winch located on the opposite side of the truck or trailer. When the strap winch is properly and sufficiently operated, it pulls on the strap to securely hold the load in place on the upper surface of the truck or trailer. The typical strap winch has a ratchet mechanism and a winding drum, around which the strap is wound upon operation of the ratchet mechanism. Conventionally, the winding drum has one or more apertures that are configured to receive the tapered end of an elongated winch bar, as exemplified in related art patents U.S. Pat. No. 5,433,565 to Chan, U.S. Pat. No. 5,775,175 to Salemno and U.S. Pat. No. 5,425,154 to Edwards. The load is secured to the truck or trailer by inserting the winch bar into the winding drum aperture and pushing or pulling on the bar to rotate a portion of the strap around the drum. To continue tightening the strap, the bar is removed from the drum, inserted into another aperture and then pushed or pulled to rotate the drum and place more of the strap on the drum. The winch's ratchet mechanism holds the drum in place to prevent the strap from unwinding when the bar is removed from the aperture. This process is repeated until the strap is tight against the load to secure it to the truck or trailer.

The aforementioned conventional method and mechanisms for securing a load to a truck or trailer using straps and strap winches has been used for many years and is believed to still be the most commonly utilized method. However, this method is known to have a number of significant limitations. The most common of which is the amount of time it takes to rotate the drum around a sufficient amount of turns to tighten the strap and secure the load. As set forth above, the winch bar has to be removed from the drum and then reinserted for each relatively small portion of the strap that is wound around the drum during each winding cycle. This then has to be repeated for each strap/winch combination on the truck or trailer. Another limitation with the current method and mechanisms is that a number of injuries have resulted from the winch bar slipping out of the winch when in use. Each time the winch bar is inserted or removed from the winch there is the potential that the ratchet mechanism will slip.

As an alternative to the typical winch bar, some ratcheting mechanisms utilize an elongated rewind crank that allows the user to rotate the crank and ratchet the winding drum to tie down the straps to secure the load to the truck or trailer. Related art patents which exemplify these types of cranks or winding bars used to ratchet the winding include U.S. Pat. No. 6,092,437 to Sumner, U.S. Pat. No. 6,102,637 and U.S. Patent No. D423,332 to Salter. A primary disadvantage of this type of ratcheting mechanism is the inability, at least the perceived inability, to provide sufficient leverage force on the winding drum to tighten the straps to hold the load. As a result, despite the known limitations of winch bars, the winch bar is the generally preferred device to utilize to operate the ratcheting mechanism.

The aforementioned patents present various apparatuses for use as a winch bar or crank for winding a strap around the winding drum of a strap winch. However, none of these patents disclose a winch bar that allows the user to wind the strap winch without removing the winch bar from the strap winch and without having to modify, at least to some extent, the configuration of the standard strap winch. Consequently, a need exists for a relatively inexpensive, easy and safe way to use the winch bar that reduces the amount of time it takes to effectively secure a load onto a truck or trailer with straps that is suitable for use with the unmodified standard strap winch. The preferred winch bar should be configured to work with conventional strap winches without modification to the strap winch and allow the user to rotate the winding drum without having to remove (and therefore reinsert) the winch bar into the drum apertures. The winch bar should allow the user to sufficiently and safely tighten the strap winch to secure the load to the truck or trailer.

SUMMARY OF THE INVENTION

The tie-down strap winch bar of the present invention solves the problems identified above. That is to say, the present invention discloses a new and useful winch bar for use with a conventional strap winch to wind a strap around a winding drum so as to tighten the strap and secure a load. The winch bar of the present invention is inserted into an aperture on the ratchet wheel side of the winch such that it interacts with the winch ratchet wheel to tighten the strap around the drum, thereby avoiding the need to repeatedly remove and reinsert the winch bar into the drum apertures. The present winch bar can be utilized with most standard strap winches without any need to modify the configuration of the strap winch.

In a preferred embodiment of the present invention, the winch bar primarily comprises an elongated bar member, an insert member, a bar pawl and a spring to bias the bar pawl. The elongated bar member has a first end and an opposing second end, with the insert member attached at or near the first end of the bar member. The bar pawl has a first end and a second end. The first end of the bar pawl is pivotally attached to the bar member such that the second end of the bar pawl abuts the insert member when the winch bar is in a closed position. A first spring connector is attached to the bar member such that the spring is disposed between the first spring connector and the bar pawl. The spring should be configured to bias the bar pawl toward the insert member when the winch bar is in the closed position. The winch bar of the present invention is configured to operatively wind a strap winch having a ratchet mechanism that includes a winding drum with a longitudinal opening therein and a ratchet wheel, with a plurality of teeth thereon, operatively connected thereto. In use, when the insert member is engaged in the longitudinal opening the second end of the bar pawl will operatively engage the one or more teeth on the ratchet wheel. The winch bar winds the winding drum when the bar member is rotated in one direction and ratchets against the ratchet wheel when rotated in the opposite direction to allow winding of the winding drum without having to remove the winch bar from the ratchet mechanism of the strap winch.

The bar pawl can further comprise a second spring connector fixedly attached thereto, with the spring being disposed between the first spring connector and the second spring connector to bias the bar pawl towards the insert member or the teeth of the ratchet wheel. The second spring connector can be a pin element fixedly attached to the bar pawl. The first spring connector can be a cap screw that is attached to the connector that attaches the insert member to the bar member and can be located on the opposite side of the bar member from the insert member. The cap screw can comprise a hole therein attaching the spring to the cap screw. The second end of the winch bar can be tapered to allow the use of an extension bar or "cheater" when additional force is needed to wind the strap winch. Although a number of configurations are possible for winch bar, the inventor has found that a tubular bar member which is approximately twelve to thirty-six inches long is generally sufficient. Because the winch bar is utilized in outdoor conditions, it should be made out of light weight and corrosion resistant materials, such as aluminum and plated steel.

Accordingly, the primary objective of the present invention is to provide a winch bar that overcomes the disadvantages associated with presently available winch bars, which are used to operate a strap winch so as to tighten the straps and secure a load to a truck or trailer, without requiring modification to existing strap winches.

It is also an important objective of the present invention to provide a winch bar that can interact with and operate conventional strap winches so as to tighten the straps and secure a load to a truck or trailer surface.

It is also an important objective of the present invention to provide a winch bar that has a bar ratchet mechanism to allow the winch bar to rotate the winding drum on a strap winch without removing the bar from the strap winch.

It is also an important objective of the present invention to provide a winch bar comprising a bar member having an insert member located at the first end thereof for insertion into an opening located at the ratchet wheel side of the winch strap, a bar pawl for interaction with the ratchet wheel member portion of the ratchet mechanism and a spring interconnecting the insert member and the bar pawl for engaging the bar pawl with the ratchet mechanism ratchet wheel.

The above and other objectives of the present invention will be explained in greater detail by reference to the attached figures and the description of the preferred embodiment which follows. As set forth herein, the present invention resides in the novel features of form, construction, mode of operation and combination of processes presently described and understood by the claims.

BRIEF DESCRIPTION OF THE DRAWINGS

In the drawings which illustrate the best modes presently contemplated for carrying out the present invention.

DETAILED DESCRIPTION OF THE PREFERRED EMBODIMENTS

Figure 2:
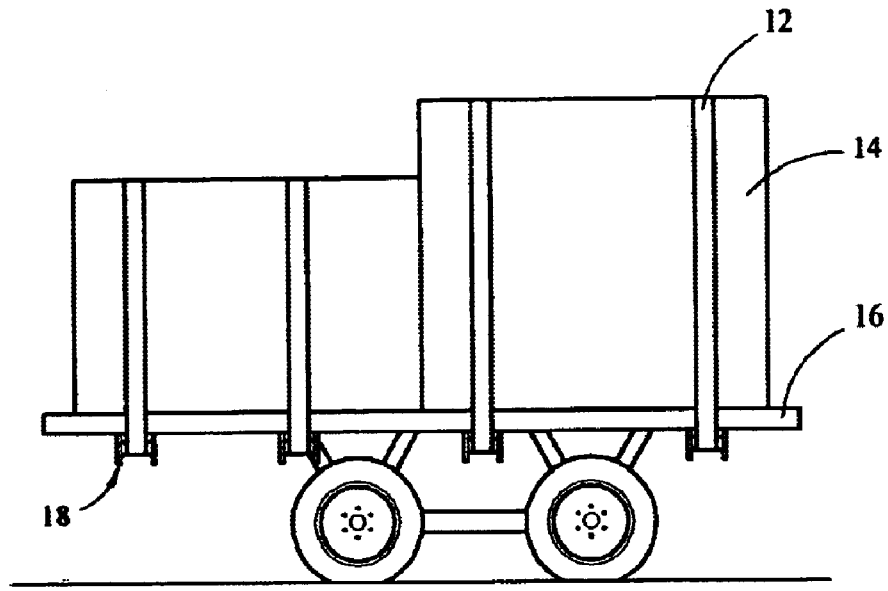
FIG. 2 is a side view of a conventional trailer utilizing a strap and strap winch system to secure a load to the trailer by utilizing the tie-down strap winch bar of the present invention.
Figure 3:
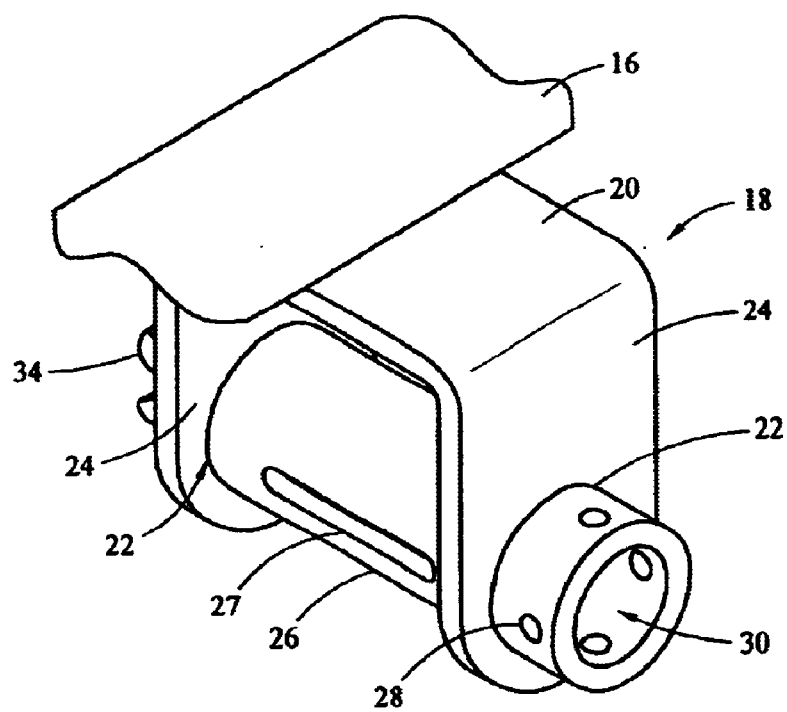
FIG. 3 is a perspective view of a typical strap winch which can be operated with the tie-down strap winch bar of the present invention.

With reference to the figures where like elements have been given like numerical designations to facilitate the reader's understanding of the present invention, and particularly with reference to the embodiment of the present invention illustrated in FIGS. 1, 5 and 6, the preferred embodiments of the present invention are set forth below. In the preferred embodiment of the present invention, shown in FIGS. 1, 5 and 6, the tie-down strap winch bar of the present invention, identified generally as 10, is configured to tighten tie-down straps 12, such as those used to secure a load 14 onto a surface of a truck or trailer 16 (a trailer is shown), through use of a strap winch 18. As is known, securing systems utilizing tie-down straps 12 are also used to secure other objects to surfaces other than trucks or trailers 16. As best shown in FIG. 2, the typical tie-down strap system includes the strap 12 that goes over the load 14 and the strap winch 18 attached to the truck or trailer 16. In the typical tie-down system, the strap 12 is connected at one of its ends to one side of the truck or trailer 16 (opposite the side shown in FIG. 2) and then pulled over the top of the load 14 to connect with the strap winch 18 located on the opposite side of the truck or trailer 16. The typical strap winch 18, an example of which is shown in FIG. 3, is configured with a generally U-shaped bracket 20 that attaches to the truck or trailer 16 such that the U-shape is inverted or downwardly facing. Bracket 20 has a pair of circular openings 22 in the sides 24 of bracket 20 through which is positioned a winding drum 26, typically in the shape of an elongated tubular member (as shown), having a slot 27 configured to receive strap 12 therein and a longitudinal opening 30 therethrough. When the strap 12 is pulled over load 14, the end of the strap 12 is inserted into slot 27 such that when drum 26 is turned the strap 12 will wind around the drum 26 to tighten against load 14 and secure load 14 to the truck or trailer 16.

Figure 4:
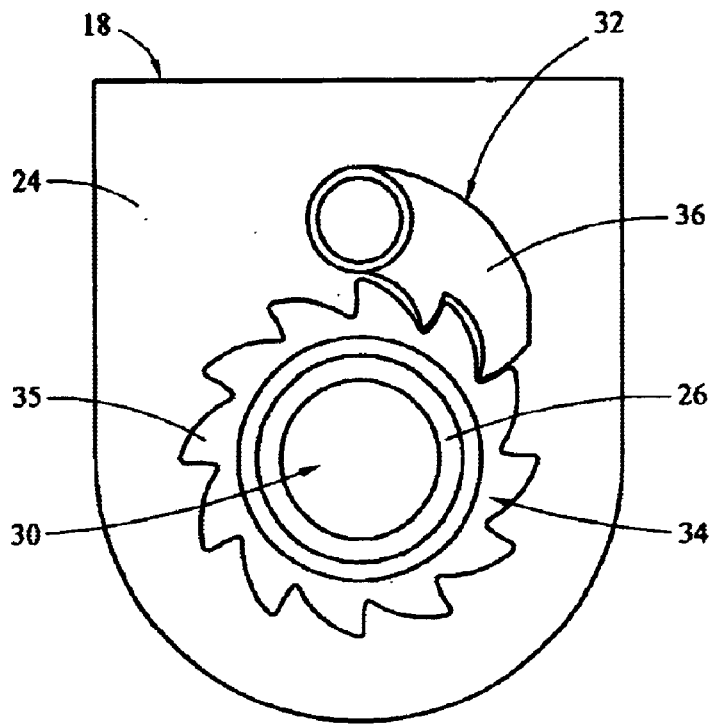
FIG. 4 is a side view of the ratchet wheel side of a typical strap winch that interacts with the tie-down strap winch bar of the present invention.

As shown in FIG. 3, the winding drum 26 generally extends beyond the sides 24 of bracket 20. On one side of bracket 20 the drum 26 contains one or more apertures 28 for receiving one end of a conventional winch bar (not shown), which is generally in the shape of an elongated bar that is tapered at the end that sized to fit inside aperture 28. Typically, the apertures 28 extend through the wall of drum 26 to communicate with a longitudinal opening 30 at the end of drum 26. On the opposite side of bracket 20, a winch ratchet mechanism 32 is used to prevent the strap 12 from unwinding around drum 26 as the conventional winch bar is removed from one aperture 28 and inserted into another aperture 28. The typical winch ratchet mechanism 32 comprises a ratchet wheel 34 having a plurality of teeth 35 and a winch pawl 36 attached to the side 24 of bracket 20, as shown in FIG. 4. The ratchet wheel 34 is operatively attached to drum 26 such that the rotational movement of one is transferred to the other. In the typical configuration, the longitudinal opening 30 in drum 26 extends through drum 26 to the ratchet wheel 34 side of bracket 20. Alternatively, drum 26 may have an opening 30 at each end of drum 26. When using a conventional winch bar, the winch bar is inserted into one or more of the apertures 28 and then pivoted to rotate drum 26 and cause strap 12 to wind around drum 26. Continued rotation of drum 26 results in strap 12 being tightened as it is further wound around drum 26 to secure load 14 to truck or trailer 16.

Figure 1:
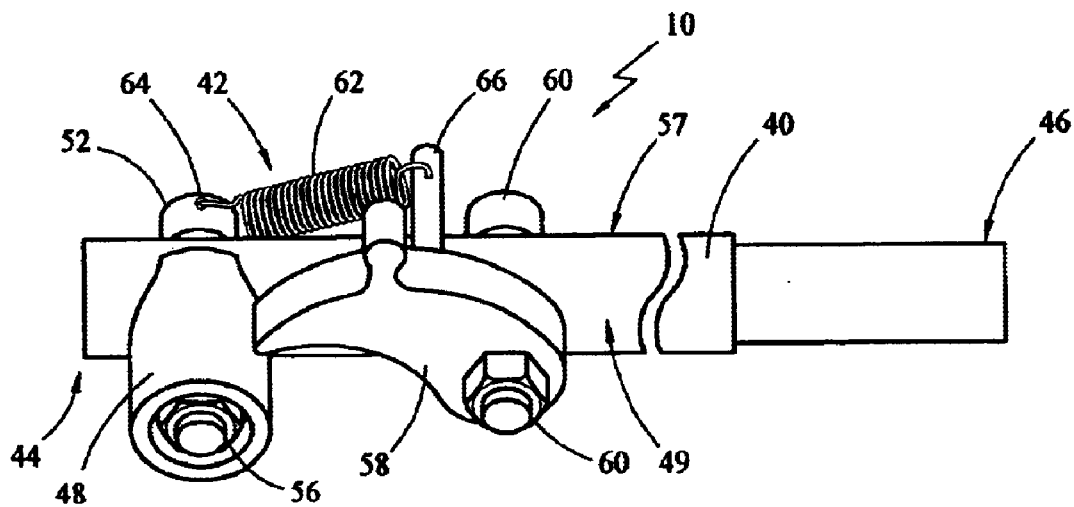
FIG. 1 is an illustration of the preferred embodiment of the tie-down strap winch bar of the present invention.
Figure 5:
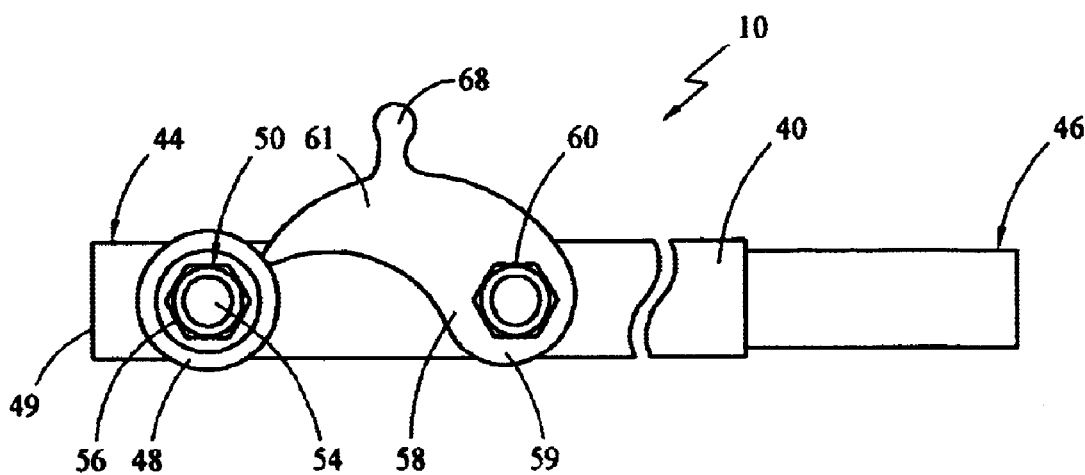
FIG. 5 is side view of the winch bar of the present invention showing the insert member and bar pawl.
Figure 6:
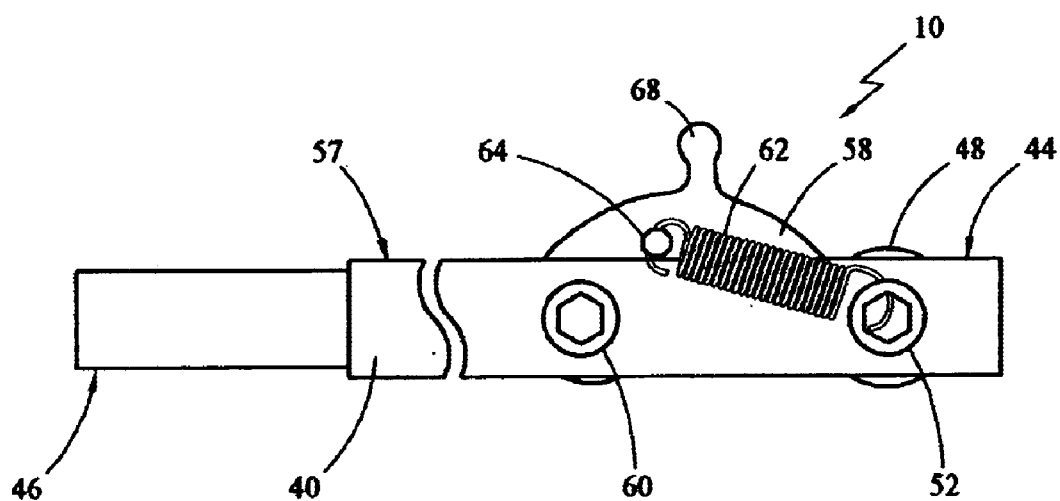
FIG. 6 is a side view of the winch bar of the present invention showing the opposite side that shown in FIG. 5.

The preferred embodiment of the present invention 10 shown in FIGS. 1, 5 and 6, includes an elongated bar member 40, such as a tubular or solid bar, having a bar ratchet mechanism 42 affixed near the first end 44 of bar 40. Also in the preferred embodiment, the second end 46 of bar 40 is tapered, as shown in FIGS. 1, 5 and 6. In the preferred embodiment, bar ratchet mechanism 42 comprises an insert member 48 on a first side 49 of bar 40 affixed at or near the first end 44 of bar 40 by use of a first connector 50. Insert member 48 is dimensioned to fit within opening 30. The typical configuration for opening 30 will be generally circular, requiring a generally cylindrical insert member 48. In the preferred embodiment, shown best in FIG. 5, first connector 50 comprises a bolt 54 having a nut 56 attached thereto. A first spring connector 52, shown best in FIG. 6, is positioned on the opposite facing side ±7 of bar member 40 from insert member 48. In the preferred embodiment, first spring connector 52 is an enlarged member of the bolt 54, such as a cap screw, that extends outwardly from the surface of bar 40. A bar pawl 58 is attached to bar 40 by use of second connector 60 generally at the first end 59 of bar pawl 58. The bar pawl 58 is located generally towards the second end 46 of bar 40 from insert member 48. In the preferred embodiment, the second end 61 of bar pawl 58 abuts against insert member 48, as shown in FIGS. 1 and 5, and bar pawl 58 is configured to pivot around second connector 60 such that the pivot axis of bar pawl 58 is generally parallel to first connector 50 and perpendicular to the longitudinal axis of bar 40. Attached to first spring connector 52 is spring 62 for biasing bar pawl 58 toward insert member 48 when winch bar 10 is in a closed position, as shown in FIGS. 1 and 5. Spring 62 can be attached or affixed to the cap screw 52 by various known methods, including the use of a hole 64 through which the spring 62 is connected (i.e., by bending a portion of the spring 62). The opposite end of spring 62 is connected to a second spring connector, such as pin element 66, which is fixedly connected to bar pawl 58. In this manner, as bar pawl 58 pivots away from insert member 48 spring 62 will bias bar pawl 58 back towards insert member 48. Spring 62 should be of sufficient strength to tightly bias bar pawl 58 against insert member 48 when winch bar 10 is in a closed position (shown in FIGS. 1 and 5). Bar pawl 58 should be shaped and configured and spaced apart from insert member 48 a distance such that it can interact with the multi-toothed ratchet wheel 34 and operatively engage at least one of the plurality of teeth thereon. In the preferred embodiment, bar pawl 58 has a shaped thumb portion 68 to allow the user to easily pull back the bar pawl 58, as described below.

In use, the strap 12 is connected to the side of the truck or trailer 16 opposite the strap winch 18 and then brought over the top of the load 14 to connect to strap winch 18. Typically, the end of strap 12 is inserted into slot 27. The strap winch bar 10 of the present invention is then used to tighten the strap 12 and secure load 14 to the truck or trailer 16. Bar pawl 58 is manually pulled back by utilizing the thumb portion 68 (i.e., similar to the way a hammer is cocked on a gun) and insert member 48 is inserted into the longitudinal opening 30 of ratchet mechanism 32 on the side of bracket 20. Bar pawl 58 is then released such that bar pawl 58 meshes with the teeth 35 on ratchet wheel 34 in a locked configuration. Once insert member 48 is inserted in opening 30, bar member 40 extends perpendicular (vertically, horizontally or at an angle) from the intersection on insert member 48 and ratchet mechanism 32. The user of winch bar 10 then grabs bar member 40 and rotates it in a direction proper to cause ratchet mechanism 32 to tighten strap 12. As the user operates bar member 40 to move ratchet wheel 34 of ratchet mechanism 32, by rotating bar member 40, the bar pawl 58 remains locked against ratchet wheel 34 causing drum 26 to rotate and a portion of strap 12 to wind around drum 36, thereby tightening strap 12 against load 14. Once the user has moved the bar 40 a comfortable distance, the bar member 40 is pivoted or rotated the opposite way. In this direction, bar pawl 58 does not engage the teeth 35 on ratchet wheel 34 of ratchet mechanism 32. Instead, bar pawl 58 moves across ratchet wheel 34 (i.e., in a ratcheting fashion) to allow the user to move the bar member 40 back to or near its starting position. While the bar member 40 is moving back (ratcheting), winch pawl 36 holds ratchet wheel 34 in place, preventing the strap 12 from unwinding. When the user positions the bar member 40 at or near the starting position, the interaction of spring 62 on bar pawl 58 locks bar pawl 58 against the teeth 35 in ratchet wheel 34 so that he or she can rotate bar member 40 again to cause another portion of strap 12 to wind around drum 36 and further tighten strap 12 against load 14. Continuing in this manner, the user can tighten strap 12 against load 14 without having to remove winch bar 10 from the strap winch 18. This will reduce the amount of time necessary to tighten strap 12 and secure load 14 and reduce the likelihood of injuries.

The bar member 40 of the winch bar 10 can be manufactured out of a variety of materials, including aluminum, steel or various high strength composites. In the preferred embodiment, bar member 40 is made out of a high strength yet relatively light weight material, such as hardened 6061 T6 aluminum, that makes it easier to utilize and relatively inexpensive to manufacture. Because the winch bar 10 will generally be utilized in outdoor conditions, it is further preferable that the material be somewhat corrosion resistant or coated with a corrosion resistant material. In one preferred configuration, winch bar 10 has a bar member 40 of one inch diameter and eighteen inches long having a tapered second end 46 of approximately two inches, tapering down to a diameter of three-fourths of an inch. Bar member 40 can be made longer or shorter, as an example twelve to thirty-six inches long. A shorter bar member 40 is easier to store, but potentially harder to use. A longer bar member 40 allows more torque leverage to be applied, but is generally harder to store. The reduced diameter or tapered portion of bar member 40 at its second end 46 is suitable for attaching an extension member (not shown), also known as a cheater bar, to assist in applying sufficient torque to tightly wind strap 12 around drum 26 to secure load 14 to the truck or trailer 16.

The other components of winch bar 10 should also be made out of materials suitable for use with the present invention (i.e., of sufficient strength and out of corrosion resistant material). Insert member 48 or bar pawl 58 can also be made out of aluminum or be made out of chrome plated steel. The connectors, first 50 and second 60, can comprise zinc plated bolts and the spring 62 can be made out of stainless steel. In a preferred embodiment, the longitudinal axis of insert member 48 (and first connector 50) is located approximately one inch from first end 44 of bar member 40 and the longitudinal axis of second connector 60 is located approximately three and three-fourths inches from first end 44 of bar member 40. In this embodiment, the distance between first spring connector 52 and pin 66 is approximately two inches. In one configuration, which is dependent on the size of opening 30 at the ratchet mechanism 32, the diameter of insert member 48 is approximately one inch and it extends outwardly approximately one and one-fourth inch from bar member 40. These sizes would need to be adjusted for different sized strap winches 18.

While there are shown and described herein certain specific alternative forms of the invention, it will be readily apparent to those skilled in the art that the invention is not so limited, but is susceptible to various modifications and rearrangements in design and materials without departing from the spirit and scope of the invention. In particular, it should be noted that the present invention is subject to modification with regard to the dimensional relationships set forth herein and modifications in assembly, materials, size, shape, and use. In addition, the present invention is suitable for use wherever strap winches are used, including those situations other than for trucks and/or trailers. For instance, the present invention can be used to secure loads to the decks of trains, ships, airplanes or other modes of transportation or wherever loads are secured by strap winches.

What is claimed is:

1. A winch bar for winding a strap winch having a ratchet mechanism including a winding drum with a longitudinal opening therein and a ratchet wheel operatively connected thereto, the ratchet wheel having a plurality of teeth thereon, said winch bar comprising:
   an elongated bar member having a first end and an opposing second end;
   an insert member attached at said first end of said bar member, said insert member dimensioned to fit within the opening;
   a bar pawl having a first end and a second end, said first end of said bar pawl pivotally attached to said bar member such that said second end of said bar pawl abuts said insert member when said winch bar is in a closed position, said second end of said bar pawl configured to operatively engage at least one of the plurality of teeth on the ratchet wheel;
   a first spring connector attached to said bar member; and
   a spring disposed between said first spring connector and said bar pawl, said spring configured to bias said bar pawl toward said insert member when said winch bar is in said closed position or the plurality of teeth on the ratchet wheel when said insert member is engaged in the opening;
   wherein when said insert member is engaged in said opening and said bar pawl operatively engages said ratchet wheels said winch bar will wind said winding drum when said bar member is rotated in one direction and ratchet against said ratchet wheel when rotated in the opposite direction so as to allow winding of said winding drum while said winch bar remains engaged with said ratchet mechanism of said strap winch.

2. The winch bar according to claim 1, wherein said bar pawl further comprises a second spring connector fixedly attached thereto, said spring being disposed between said first spring connector and said second spring connector.

3. The winch bar according to claim 2, wherein said second spring connector comprises a pin element attached to said bar pawl.

4. The winch bar according to claim 1, wherein said first spring connector comprises a cap screw attached to a first connector, said first connector configured to attach said insert member to said bar member.

5. The winch bar according to claim 4, wherein said cap screw comprises a hole therein for attaching said spring to said cap screw.

6. The winch bar according to claim 1, wherein said second end of said bar member is tapered.

7. The winch bar according to claim 1, wherein said bar pawl has a thumb portion disposed between said first end and said second end of said bar pawl.

8. The winch bar according to claim 1, wherein said insert member is generally cylindrical.

9. The winch bar according to claim 1, wherein said bar member is approximately twelve to thirty-six inches long.

10. The winch bar according to claim 1, wherein said bar member is made out of a light weight and corrosion resistant material.

11. The winch bar according to claim 10, wherein said bar member is made out of aluminum.

12. The winch bar according to claim 1, wherein said bar member is generally tubular.

13. The winch bar according to claim 1, wherein said bar member has a first side and an opposite facing second side, said first spring connector attached to said first side of said bar member and said insert member attached to said second side of said bar member.

14. A winch bar for winding a strap winch having a ratchet mechanism including a winding drum with a longitudinal opening therein and a ratchet wheel operatively connected thereto, the ratchet wheel having a plurality of teeth thereon, said winch bar comprising:
   an elongated bar member having a first end and an opposing second end;
   an insert member attached at said first end of said bar member, said insert member dimensioned to fit within the opening;
   a bar pawl having a first end and a second end, said first end of said bar pawl pivotally attached to said bar member such that said second end of said bar pawl abuts said insert member when said winch bar is in a closed position, said second end of said bar pawl configured to operatively engage at least one of the plurality of teeth on the ratchet wheel;
   a first spring connector attached to a side of said bar member opposite said insert member;
   a second spring connector attached to said bar pawl; and
   a spring disposed between said first spring connector and said second spring connector, said spring configured to bias said bar pawl toward said insert member when said winch bar is in said closed position or the plurality of teeth on the ratchet wheel when said insert member is engaged in the opening.

15. The winch bar according to claim 14, wherein said second spring connector comprises a pin element attached to said bar pawl.

16. The winch bar according to claim 14, wherein said first spring connector comprises a cap screw attached to a first connector, said first connector configured to attach said insert member to said bar member.

17. The winch bar according to claim 14, wherein said bar member is made out of a light weight and corrosion resistant material.

18. A winch bar comprising:
   an elongated bar member having a first end and an opposing second end;
   an insert member attached at said first end of said bar member;
   a bar pawl having a first end and a second end, said first end of said bar pawl pivotally attached to said bar member such that said second end of said bar pawl abuts said insert member when said winch bar is in a closed position;

a first spring connector attached to said bar member; and a spring disposed between said first spring connector and said bar pawl, said spring configured to bias said bar pawl toward said insert member when said winch bar is in said closed position.

19. The winch bar according to claim 18, wherein said bar pawl further comprises a second spring connector fixedly attached thereto, said spring being disposed between said first spring connector and said second spring connector.

20. The winch bar according to claim 18, wherein said bar member has a first side and an opposite facing second side, said first spring connector attached to said first side of said bar member and said insert member attached to said second side of said bar member.

* * * * *